March 12, 1935.  E. E. WINKLEY  1,994,330
SPEED CONTROL MECHANISM
Filed Aug. 2, 1933   5 Sheets-Sheet 1
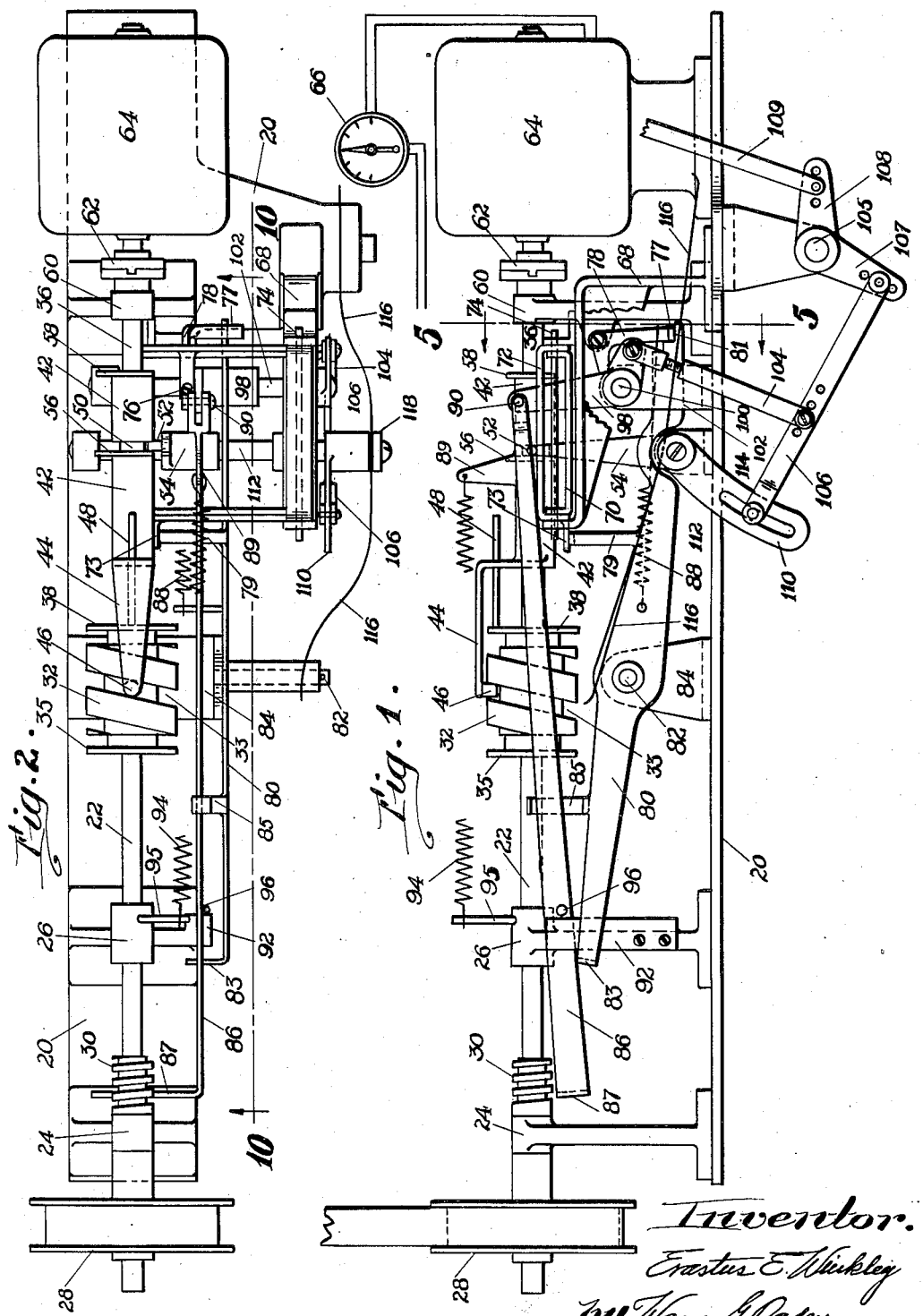
Inventor.
Erastus E. Winkley
by Warren G. Ogden
Atty.

March 12, 1935.  E. E. WINKLEY  1,994,330
SPEED CONTROL MECHANISM
Filed Aug. 2, 1933   5 Sheets-Sheet 2
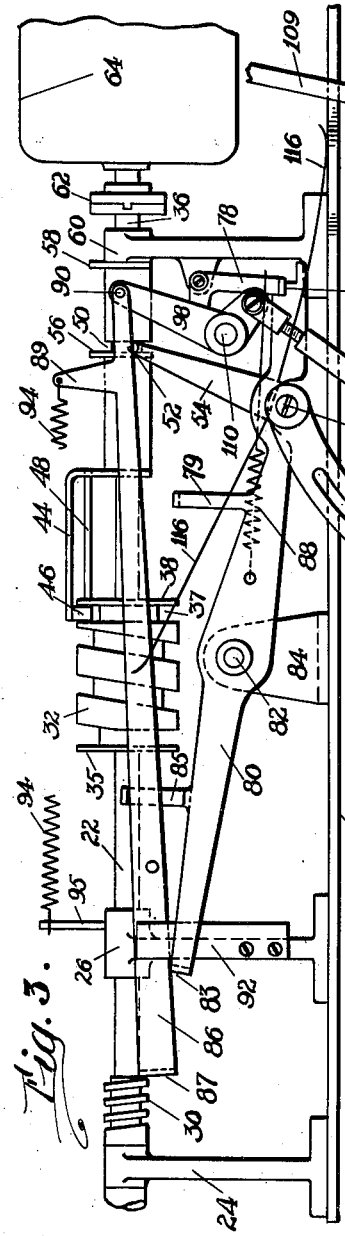
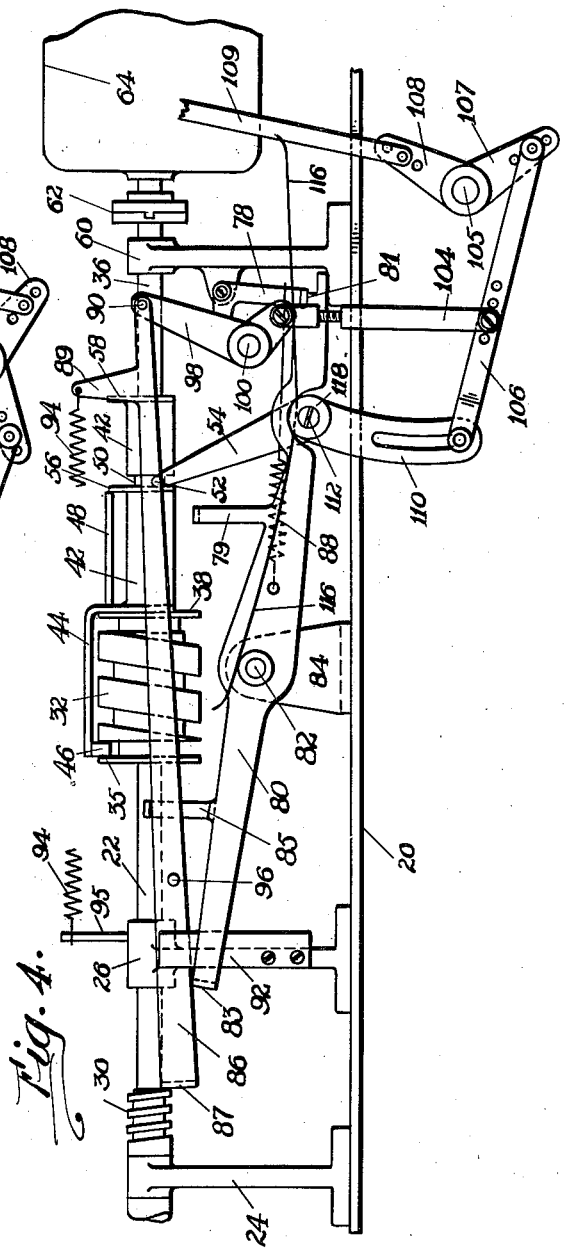
Inventor.
Erastus E. Winkley
by James G. Ogden
Atty.

March 12, 1935.  E. E. WINKLEY  1,994,330
SPEED CONTROL MECHANISM
Filed Aug. 2, 1933   5 Sheets-Sheet 4
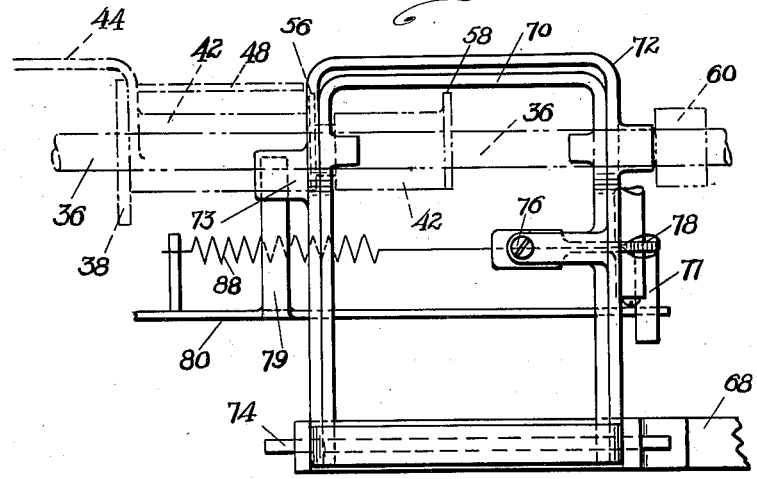
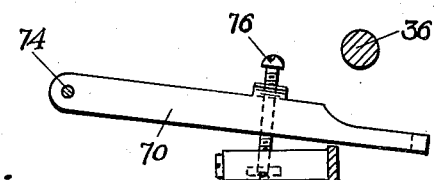
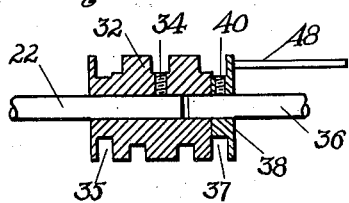
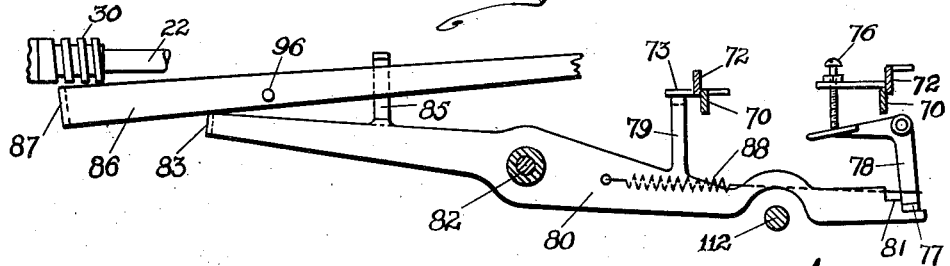
Inventor.
Erastus E. Winkley
by Warren G. Ogden Atty.

March 12, 1935.　　E. E. WINKLEY　　1,994,330
SPEED CONTROL MECHANISM
Filed Aug. 2, 1933　　5 Sheets-Sheet 5

Inventor.
Erastus E. Winkley
by Warren G. Ogden
Atty.

Patented Mar. 12, 1935

1,994,330

UNITED STATES PATENT OFFICE 1,994,330

SPEED CONTROL MECHANISM

Erastus E. Winkley, Lynn, Mass.

Application August 2, 1933, Serial No. 683,367

14 Claims. (Cl. 264—9)

This invention relates to speed control mechanism for engines or motors employed wherever it may be desired to maintain a uniform speed of operation regardless of variations in the load upon the engine. An important field of use of the invention is in the control of automobile engines, and the invention will be illustrated and described as adapted for this purpose although it is of more general application.

Attempts have heretofore been made to control the engine of an automobile through a governor so that the vehicle will maintain a uniform speed upon the road regardless of load, grade or of the surface conditions encountered. In practice, these conditions cause the load upon the engine to fluctuate suddenly between wide extremes and on this account a governor control has not proved satisfactory or adequate. This is partly because the range of movement required of the valve or other controlling device exceeds that which can be efficiently transmitted directly from a governor and partly because the controlling means has not heretofore been designed to respond to the change of load on the engine in a manner to obtain, at the proper time, the full effect of an increased or decreased supply of motive fluid. It is with these difficult problems that the invention is principally concerned and its object is to overcome them.

In its broader aspects the invention aims to provide a speed control mechanism the operation of which is governed by a variation of the engine speed from that of a master shaft which is set by the operator to the standard or rate of speed desired to be maintained. Whenever the engine speed tends to vary from that of the master shaft the throttle, as in an automobile, will immediately respond in a direction to restore the engine speed to that of the master shaft. The primary control mechanism is such that within certain limits or for ordinary changes in load on the engine there may be obtained a gradual step-up or step-down of the engine speed through a partial opening or closing of the throttle; but should the load increase or decrease suddenly or excessively then through auxiliary control mechanism the throttle is fully closed or opened as may be required to neutralize such a marked change from the speed of the master shaft.

To the accomplishment of this object and such others as may hereinafter appear, as will readily be apparent to those skilled in the art from the following description, the invention comprises the features and combinations of parts hereinafter described and then particularly pointed out in the appended claims.

Referring to the accompanying drawings:

Figure 1 is a view, in side elevation, showing the complete mechanism somewhat diagrammatically. The mechanism is in neutral position (speed of the engine shaft and master shaft synchronous);

Fig. 2 is a plan view of the parts shown in Fig. 1;

Fig. 3 is a diagrammatic view, omitting the auxiliary control mechanism yokes, showing the positions of the throttle connected parts of the mechanism when the throttle is wide open;

Fig. 4 is a view similar to Fig. 3 showing the positions of the throttle connected parts of the mechanism when the throttle is closed;

Fig. 8 is a plan view of the two pivoted yokes showing, in dot and dash lines, the relation of the actuating cams thereto when the throttle operating mechanism is closed, as shown in Fig. 4;

Fig. 9 is a view, in end elevation and partly in section, showing the rear side member of the inner yoke of Figs. 5 and 6, and the attached adjustable screw which operates to release the throttle operating mechanism;

Fig. 10 is a view, in side elevation, of the throttle operating mechanism after release by the device shown in Fig. 9, as viewed from the line 10—10 of Fig. 2;

Fig. 11 is a sectional view through the cylindrical feed cam;

Figure 5:
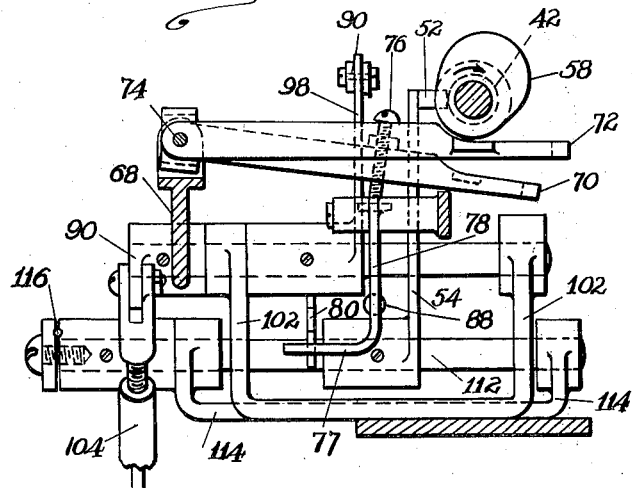
Fig. 5 is a view, in transverse section on the line 5—5 of Fig. 1, showing the two nested auxiliary control mechanism yokes the movement of which determines a full opening or closing of the throttle. In this view the inner yoke is shown depressed.

In the embodiment of the invention as illustrated for automobile control in the drawings, the control mechanism is mounted on a base plate 20 (Figs. 1 and 2) which may be secured under the hood adjacent to the engine. The various elements of the mechanism include a longitudinal shaft 22 journaled in bearings and supports 24 and 26 and having a pulley 28 mounted upon its forward end which is driven directly from a pulley on the cam shaft of the engine or from some other part thereof, rotating in predetermined ratio to the engine speed. A worm 30, adjacent the bearing 24, is pinned to the shaft 22 and rotates with it.

A cylindrical cam 32 having a helical feed groove 33 is attached to the extreme right-hand or rear end of the shaft 22 by a set screw 34 (Fig. 11). A flange at the forward end of the cam 32 forms a circular groove 35 into which the forward end of the helical cam groove 33 leads. A master or standard speed shaft 36, in axial line with the shaft 22, has its extreme forward end supported inside of the cylindrical cam 32. A flanged collar 38, forming a circular groove 37 into which the rear end of the helical cam groove 33 leads, is secured to the shaft 36 by a set screw 40 (Fig. 11). The shaft 36, journaled in a bearing and support 60 near its rear end, with its collar 38 is free to rotate independently of the rotation of the cam 32.

Referring to Figs. 1 and 2, the master shaft 36 carries a loose sleeve 42 having an L-shaped arm 44 overlapping the cam 32. The arm 44 has a follower 46 riding in the helical groove 33 of the cam 32. The sleeve 42 is rotated by a pin 48 riveted through the flanged collar 38 and having a sliding fit through a hole in the arm 44. By this connection the sleeve 42 rotates directly with the shaft 36 but is free to be fed or slide axially of said shaft under the influence of the feed cam 32. Substantially centrally of the sleeve 42 is a peripheral groove 50 in which travels a follower 52 attached to an arm 54. The arm and follower, which with the moving sleeve form the primary control mechanism, show clearly in Fig. 5; likewise the shape of two intermittent-motion plate cams 56 and 58 which are attached to the central portion and to the rear end respectively of the sleeve 42. The shaft 36 is positively driven at a predetermined constant speed, through a coupling 62, by a direct current motor 64 connected by suitable wiring to the storage battery of the vehicle. The speed of the motor is controlled by a rheostat 66 (Fig. 1), mounted on the dash, enabling a variation in speed of the master shaft 36 at the will of the operator. The aligned shafts 22 and 36 always turn in a clockwise direction when viewed from the rear motor end of the mechanism.

Figure 13:
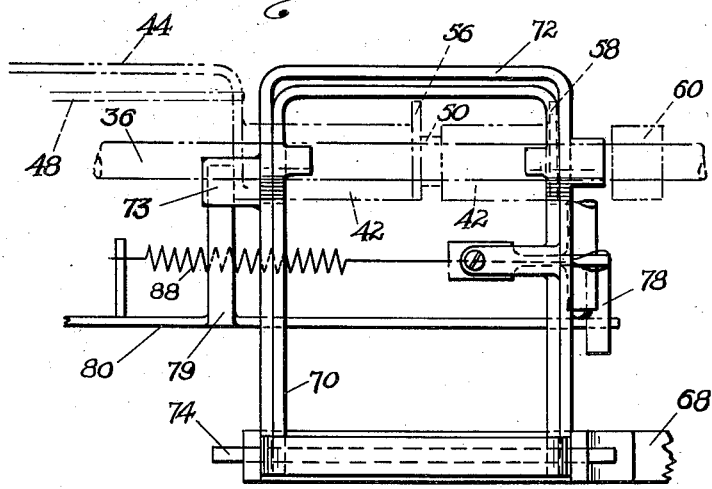
Fig. 13 is a plan view of the two pivoted yokes showing, in dot and dash lines, the relation of the actuating cams thereto when the throttle operating mechanism is open as shown in Fig. 3.

A bracket 68 (Figs. 1 and 2) supports a pair of pivotally mounted yokes 70 and 72, one nested inside the other. Both yokes are freely hinged on a pivot pin 74 (Figs. 5 and 6) mounted on the bracket 68. Normally, or when the auxiliary control mechanism of which these yokes form a part is not operative, the inner yoke 70 is in a down position and the outer yoke 72 is in an up position (see Fig. 5). Said yokes are rocked about the pivot 74 by the two plate cams 56 and 58 when, due to movement of the sleeve 42, said cams are positioned above the side frames of the yokes as shown by dot and dash lines in Figs. 8 and 13.

Figure 12:
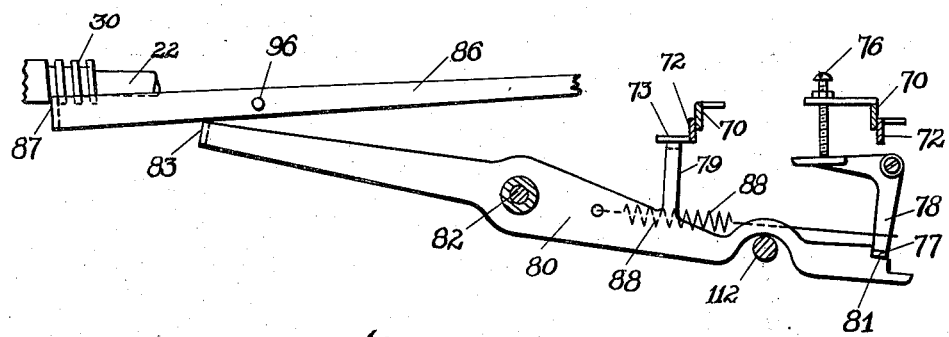
Fig. 12 is a view, in side elevation, of part of the throttle operating mechanism just after becoming operative.

When the outer yoke 72 is depressed by the plate cam 56 a shelf 73 (Figs. 1 and 6) on its forward side arm contacts and depresses an upright arm 79 on the rear end of a beam 80 pivoted on a shoulder pin 82 mounted in a support 84 on the base plate 20. As the rear end (Fig. 1) of the beam 80 is depressed, the forward end rises and a bent or inturned portion 83 thereof comes in contact with a push rod 86 causing a bent or inturned end portion 87 thereof, which underlies the shaft 22, to engage with the worm 30 fast on said shaft (Fig. 12). Simultaneously a foot 77 on the depending arm of a bell crank 78 pivoted to a lug on the stand 60, is pulled over by the tension of a spring 88, connecting the lever 78 with the beam 80, onto the upper step 81 at the extreme rear end of the beam 80, thus locking the push rod 86 in its operative position.

When the inner yoke 70 is depressed by the plate cam 58 an adjusting screw 76 (Figs. 8, 9 and 10) carried by the yoke contacts with the horizontal arm of the bell-crank lever 78 and moves its foot 77 outwardly off of the upper step 81 of the beam 80, allowing said beam to resume the position shown in Figs. 1 and 10. A lower step on the beam 80 acts as a stop to limit the upward movement of its rear end.

Engagement of the portion 87 of the push rod 86 with the rotating worm 30 causes this rod to be pushed bodily to the right (Fig. 1) or rearward, sliding past the supporting beam 80. The push rod 86 is pivoted at its extreme rear end, by a pin 90, on a bell-crank 98 and is constrained to a right-line movement by sliding in the slot of a guide block 92 secured to the bearing support 26. A lug 89 is provided on the push rod 86 near its pivoted end and to this there is hooked one end of a tension spring 94, the other end of which is attached to a pin 95 set into the bearing support 26 (Figs. 1, 3 and 4). The spring 94 tends to keep the push rod 86 pulled to the left (Fig. 1) as far as is permitted by a stop pin 96 which engages the guide block 92.

Figure 6:
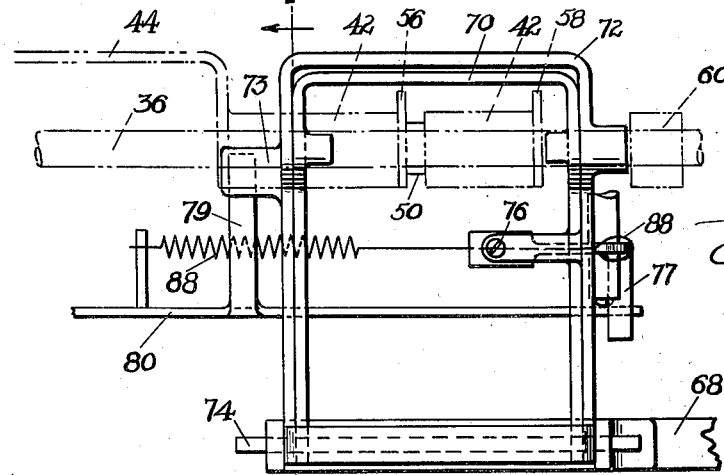
Fig. 6 is a plan view of the parts shown in Fig. 5.
Figure 7:
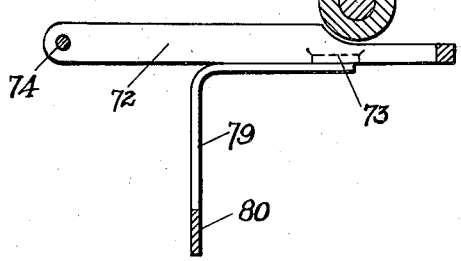
Fig. 7 is a view, in end elevation and partly in section, showing the forward side member of the outer yoke of Figs. 5 and 6 and the throttle operating mechanism controlling arm with which it contacts, on the line 7—7 of Fig. 6.

The bell-crank 98, to which the rear end of the push rod 86 is connected, is pivoted on a rock shaft 100 (Figs. 3 and 4) supported by a U-shaped bracket 102 on the base plate 20 (Fig. 5). Attached to the short lower arm of the bell-crank 98 is an adjustable rod 104 adjustably pivoted at its lower extremity to a clevis rod 106. The right-hand or rear end of the clevis rod 106 is pivoted to one arm 107 of a rocker adapted to rock on a conveniently placed stub shaft 105. The other arm 108 of the rocker is connected by a pitman 109 to the throttle of the engine, generally the butterfly valve in the carburetor. The left-hand or forward end of the clevis rod 106 is free to slide in the slot of a link 110 fast on a rock shaft 112 supported in bearings on a bracket 114 (Figs. 1 and 5). Centrally of the rock shaft 112 there is pinned the arm 54 having the follower 52 tracking in the groove 50 of the sleeve 42, as hereinbefore described.

A straight tension spring 116 of cantilever form is clamped to the outer end of the rock shaft 112 by a cap 118 (Fig. 2) and tends to keep the arm 54 in a vertical or neutral position. This is shown by Fig. 1 wherein both the forward and rear ends of the spring 116 are free, neither being under tension. The forward end is adapted to engage the long bearing (see Fig. 2) of the beam 80 and the rear end is adapted alternately to engage the base plate 20 as the rock shaft 112 is turned in one direction or the other by a considerable variation of the arm 54 from the vertical. Thus one end or the other, at certain times, is placed under tension for a purpose that will be explained later. The follower 52 of the arm 54 being in the groove 50 of the sleeve 42, tends to keep the follower 46 of the arm 44 in a central position with relation to the cylindrical cam 32, as in Figs. 1 and 2. This is the position of these parts when the speed of the engine driven shaft 22 is the same as that of the master shaft 36.

The operation of the speed control mechanism is as follows: The rheostat 66 on the dash is set at whatever speed the operator desires the vehicle to maintain on the road, as, for example, 30 miles per hour. Therefore, the master shaft 36 and its sleeve 42 are driven as a unit at a fixed rate of speed in a clockwise direction when viewed from the motor. The shaft 22 with its worm 30 and cylindrical cam 32 are also rotating in the same direction but this unit is driven from the engine through the belt over the pulley 28 and its speed varies with that of the engine. With the mechanism properly adjusted and the rheostat set at 30 miles per hour and assuming that the vehicle is moving along the road with the throttle open for 30 miles per hour and it has reached this speed, then the speed of the two axially aligned shafts 22 and 36 is synchronous. As long as there is no change in load on the engine or no tendency to increase or decrease its speed there will be no change in the throttle position on the engine, the speed of the two shafts 22 and 36 will remain the same and these two units will be the only moving parts of the mechanism. Figs. 1 and 2 show the parts in this neutral position. The other elements of the mechanism do not operate until a difference in speed between the two shafts 22 and 36 causes a change in the relation of the arm 44 and consequently of the sleeve 42 to the cylindrical cam 32.

Assume now that the load on the engine increases and that the engine speed tends to decrease, as, for example, ascending a grade. Under such conditions the speed of the shaft 22 will fall below the speed of the master shaft 36, causing the arm 44 to be drawn to the right (Fig. 1) or rearward by the action on the follower 46 in the groove 33 of the cylindrical cam 32. If the load on the engine tends to decrease for any reason the speed of the shaft 22 will then rise above the speed of the shaft 36 and the arm 44 will be drawn to the left (Fig. 1) or forward by the action of its follower in the helical cam groove 33. Any movement of the arm 44 either forward or rearward will also move the sleeve 42 axially on the shaft 36 and in the same direction. Any axial movement of the sleeve 42 will cause the arm 54 to turn from its neutral substantially vertical position (Figs. 1 and 2) and rock the shaft 112. The arm 54 is actuated by its follower 52 always in position in the groove 50 of the sleeve 42. Turning the rock shaft 112 either clockwise or contra-clockwise, viewing Fig. 1, imparts a longitudinal movement to the clevis rod 106 through the link 110 pinned to the outer end of the rock shaft. A movement of the clevis rod 106 to the left in Fig. 1 tends to open the throttle of the engine through the connecting pitman 109, and a movement of said clevis rod to the right in Fig. 1 tends to close the throttle.

A slight axial movement of the sleeve 42, insufficient to carry the cam follower 46 out of the helical groove 33, is effective to take care of a small change, either up or down, in the load on the engine. On being transmitted to the throttle by the described train of mechanism the movement of the arm 54 will open or close the throttle to the extent required to maintain the shaft 22 at the 30 miles per hour set by the master shaft 36.

If the increase in load is so great that the sleeve 42 nearly reaches the right-hand limit of its movement along the shaft 36 as determined by the helical cam groove 33 and the throttle opening is not sufficient to bring the engine up to the set speed, then, as the sleeve 42 continues to move rearward due to the continued lower speed of the shaft 22, the plate cam 58 is brought to a position where it wipes across the rear side member of the outer pivoted yoke 72 and depresses said yoke, as shown in Fig. 12. As the yoke 72 is depressed, the shelf 73 on its forward side member exerts pressure on the upright arm 79 of the beam 80 fulcrumed on the shaft 82. This depresses the rear end of the beam and raises its forward bent end 83 into contact with the push rod 86 fulcrumed at 90, thereby raising said push rod and causing its bent end 87 to engage with the worm 30 which is fixed to the shaft 22 (Fig. 12). By this time, due to the slower speed of the shaft 22 relative to that of the master shaft 36, the follower 46 has been carried rearward into the circular groove 37 as shown in Fig. 3, bringing the sleeve to rest. As the shaft 22 is continuously rotating, being driven from the engine, the worm 30 imparts a longitudinal rearward movement to the push rod 86 so long as these parts remain in engagement. The push rod 86 is held in engagement with the worm by the action of the bell-crank lever 78 which, when the rear end of the beam 80 is depressed, is pulled over on to its upper step 81 by the tension of the coil spring 88 (Figs. 3 and 12).

The movement of the push rod 86 is transmitted to the bell crank 98, then through the adjustable rod 104 to the clevis rod 106, and thence to the throttle of the engine through the pitman 109, as hereinbefore described. The extent of travel of the push rod 86 moves the clevis rod 106 within the link 110 sufficiently to give full open throttle when the sleeve 42 is at its extreme rearward position. Fig. 3 shows this position of the parts. The rearward movement of the sleeve 42 has turned the link 110 forward from its neutral position in Fig. 1 so that as the forward end of the clevis rod 106 is forced downward in the link the rod itself is drawn forward thus turning the rocker 107 in a direction to pull on the pitman 109 and open the throttle wide. As the bell-crank lever 78 is pulled over the upper step 81 of the beam 80 by the tension spring 88 its horizontal arm exerts an upward pressure on the adjusting screw 76 fastened to the inner pivoted yoke 70, pushing it into the up position as shown in Fig. 12.

The throttle being wide open, the engine turns over faster and the speed of the shaft 22 finally exceeds the standard 30 miles per hour speed of the master shaft 36. This causes the follower 46 to reverse its previous movement and travel slightly forward in the cylindrical cam 32. The follower 46 is urged out of the circular groove 37 to be caught by the helical cam groove by pressure on the sleeve 42 through the arm 54 exerted by the rear end of the tension spring 116 which, due to the excessive rearward throw of the arm 54, has engaged the base plate 20 and has been placed under tension. At this time the forward end of the spring 116 is free (see Fig. 3). The forward movement of the follower moves the sleeve 42 forward and brings its plate cam 58 in position (Fig. 13) to wipe across the rear side member of the now raised inner pivoted yoke 70 pushing this yoke back into the down position, as shown in Figs. 9 and 10. This causes the adjusting screw 76 to turn the bell crank 78 in a direction to move its foot 77 off the upper step 81 of the beam 80, thereby allowing the tension spring 94 to restore the push rod 86 to its inoperative position below the worm 30, as in Figs. 1 and 10. The portion of the beam 80 forward of its pivot 82 may be made somewhat heavier than the portion rearward of said pivot so that the forward portion will drop as soon as the bell crank foot 77 is moved off of the step 81. A strap 85 rises from the forward portion of the lever 80 and hooks over the push rod 86 so that the push rod is immediately pulled down from its stop position against the worm 30, as shown in Figs. 3 and 4, and freed to enable its forward return movement under the influence of the spring 94. This action of the push rod 86 draws the clevis rod 106 up in the link 110 and causes a partial closing of the throttle. The continued forward movement of the sleeve 42 continues to close the throttle until the engine speed, as determined by the shaft 22, equals that of the master shaft 36.

It may be assumed that so long as the engine speed remains substantially uniform, the follower 46 on the arm 44 will occupy some such position in relation to the cylindrical cam 32 as that shown in Figs. 1 and 2.

Assume now that the load upon the engine decreases, as, for example, when the vehicle reaches a slight down grade and the engine speed tends to increase. The shaft 22 will then rotate at a higher rate of speed than that of the master shaft 36, causing the arm 44 and its sleeve 42 to be drawn forward by the action of the helical groove 33 of the cam 32 on the follower 46. The forward movement of the sleeve 42 on the shaft 36 will cause the arm 54 to turn the rock shaft 112 in a contra-clockwise direction, viewing Fig. 1. This rocking of the shaft 112 causes the link 110 to move downward and rearward from the neutral position shown in Fig. 1, thereby pushing the clevis rod 106 rearward and pushing on the pitman 109 to partially close the throttle.

If the engine speed still increases, the sleeve 42 will continue its forward movement on the shaft 36, bringing its plate cam 56 in position (Fig. 8) to wipe across the forward side member of the outer pivoted yoke 72. This depression of the outer yoke causes the bent end 87 of the push rod 86 to engage the worm 30 by the same means as hereinbefore described when the sleeve 42 was moved rearward because of a continued decrease in the engine speed. The rearward movement of the push rod 86, as before described, is transmitted to the bell crank 98, through the adjustable rod 104 to the clevis rod 106 and thence to the throttle of the engine through the pitman 109, causing the throttle to close still more. By this time, due to the higher speed of the shaft 22 relative to that of the master shaft 36, the follower 46 has been carried forward into the circular groove 35 as shown in Fig. 4, bringing the sleeve to rest. As the speed of the shaft 22 falls below that of the master shaft 36 the helical groove 33 of the cam 32 acts on the traveller 46 to force the sleeve rearward on said shaft 36. The helical groove 33 obtains control of the traveller 46 because, due to the excessive forward throw of the arm 54, the forward end of the tension spring 116 has engaged the bearing hub of the beam 80 and has been placed under a tension which continually urges the traveller, while in the circular groove 35, toward the helical groove. At this time the rear end of the spring 116 is free (see Fig. 4). When the sleeve 42 reaches a position where its plate cam 56 will act to depress the inner pivoted yoke 70 the foot 77 of the bell crank 78 is thrown off of the upper step 81 of the beam 80, allowing the push rod 86 to disengage its end 87 from the worm 30 (Fig. 10) and opening the throttle until the vehicle attains its predetermined speed as set by the master shaft 36. The moving parts of the control mechanism have now been brought back to the neutral position of Figs. 1 and 2.

It will be understood by those skilled in the art that the auxiliary throttle control mechanism is so designed that it operates to impart a faster opening or closing of the throttle that is imparted by the primary throttle control mechanism. Thus, whenever the load on the engine carries the fluctuating speed shaft out of the range of the primary control mechanism the engine will respond quickly to neutralize the condition, whether an over or under load, and bring its speed back to the standard speed of the master shaft.

As hereinbefore explained, after either a quick opening or a quick closing of the throttle valve through the action of the auxiliary control mechanism which thrusts the forward end of the clevis rod down in the link with which it is connected, the push rod is then released and its spring controlled forward movement instantly lifts the clevis rod in the link to reverse the movement of the throttle valve and restore the throttle to the opening it had before the auxiliary control mechanism responded to the unusual engine load.

It will be observed that the movement of the push rod and that of the clevis rod is the same whether the throttle valve is to be quickly opened or quickly closed, the effect on the valve being determined by the angular position of the clevis rod link as already explained.

It is thus seen that the speed control mechanism exercises a gradual control of the throttle through the range permitted by the cylindrical cam and a sharper control through the range permitted by the worm on the engine driven shaft.

Obviously it is within the scope of the invention to arrange the two driven shafts otherwise than as illustrated so long as the master shaft has control of the engine driven shaft through a controller such as the cylindrical cam and its connections. Likewise it is for convenience and simplicity of design that the sliding sleeve is mounted on the master shaft because then the sleeve is directly driven at the required standard speed.

Nothing herein contained is to be interpreted as limiting the invention in the scope of its application to use in connection with the engine of an automotive vehicle or to the particular mode of operation, or both, selected for purposes of illustration and explanation. While the particulars of construction herein set forth are well suited to one mechanical form of the invention, it is not limited to these details of construction nor to the conjoint use of all its features, nor is it to be understood that these particulars are essential since they may be variously modified within the skill of the artisan without departing from the true scope of the actual invention, characterizing features of which are set forth in the following claims by the intentional use of generic terms and expressions inclusive of various modifications.

What is claimed as new, is:—

1. Speed control mechanism for engines having a throttle comprising an engine driven shaft the speed of which fluctuates with the load on the engine and a master shaft driven independently of the engine at a predetermined constant speed, a primary control mechanism including means connecting with the throttle and responsive to any slight deviation in the speed of the engine driven shaft from that of the master shaft, an auxiliary control mechanism including means connecting with the throttle and including mechanism, actuated from the primary control mechanism, connected to operate said means connecting with the throttle upon deviations in speed of the engine shaft from that of the master shaft beyond a predetermined range to which the primary control mechanism is limited.

2. Speed control mechanism according to claim 1 in which said auxiliary control mechanism operating mechanism is set to be inoperative until said primary control mechanism has ceased to function.

3. Speed control mechanism according to claim 1 in which said auxiliary control mechanism actuating means comprises a cam on said primary control mechanism.

4. Speed control mechanism according to claim 1 in which said auxiliary control mechanism comprises two independent actuators alternately responsive to said actuating means, one of which operates through said connecting means to open the throttle and the other of which operates similarly to close it.

5. Speed control mechanism according to claim 1 in which said actuating means comprises two rotary cams and said auxiliary control mechanism comprises two independent actuators alternately responsive to one or the other of said cams to open and to close said throttle.

6. Speed control mechanism comprising a constant speed driven shaft and a fluctuating speed driven shaft, mechanism controlled by a deviation in the speed of said second named shaft from that of the first for gradually restoring the speed of the second named shaft to the speed of the first, another mechanism operating more quickly for the same purpose, and a moving part carried by said first named mechanism for engaging and setting the second named mechanism into operation.

7. Speed control mechanism according to claim 6 in which said first named speed restoring mechanism is limited in operation to a relatively small deviation in speed of said second named shaft from that of the first, and means for causing said moving part for actuating the other speed restoring mechanism to remain inactive within said range but to become active outside of said range.

8. Speed control mechanism comprising a member that may be set to rotate at a predetermined standard speed, an outside constantly rotating variable speed member, differential mechanism between the two members, having a part movable in one direction or the other as the speed of the variable member exceeds or falls below standard, means for correcting such speed deviations, mechanism responsive during the displacement of said movable part for gradually operating said correcting means, and auxiliary mechanism responsive at the limits of said displacement for quickly operating said correcting means.

9. In a speed control mechanism having a master shaft set to rotate at a predetermined constant speed and a driven shaft the speed of which tends to vary and which is to be maintained at the speed of the master shaft, a primary control mechanism for overcoming small deviations in the speed of the driven shaft from that of the master shaft, and an auxiliary control mechanism for overcoming like great deviations in speed.

10. In a speed control mechanism having a master shaft set to rotate at a predetermined constant speed and a driven shaft the speed of which tends to vary and which is to be maintained at the speed of the master shaft, means for correcting deviations in the speed of the driven shaft from that of the master shaft, a slowly acting primary control mechanism having a train connected to operate said correcting means, and a quickly acting auxiliary control mechanism having a train connected to operate said correcting mechanism.

11. The invention defined by claim 10 in which said driven shaft is rotated by a throttle controlled engine and the degree of opening of said throttle constitutes the speed correcting means.

12. In a speed control mechanism having a master shaft set to rotate at a predetermined constant speed and a driven shaft the speed of which tends to vary and which is to be maintained at the speed of the master shaft, means for correcting deviations in the speed of the driven shaft from that of the master shaft, a primary control mechanism operated by said driven shaft having a train connected to operate said correcting means and having a stop device to limit its control to a predetermined range comprehending the lesser deviations in the speed of the driven shaft from that of the master shaft, and an auxiliary control mechanism also operated by said driven shaft having a train connected to operate said correcting means throughout said deviation in speed that are greater than those within said predetermined range.

13. The invention defined by claim 12 in which the train of said primary control mechanism is actuated by a slide reciprocated by said driven shaft and in which the train of said auxiliary control mechanism is actuated by means mounted on said slide.

14. In a speed control mechanism having a master shaft set to rotate at a predetermined constant speed and a driven shaft the speed of which tends to vary and which is to be maintained at the speed of the master shaft, means for correcting deviations in the speed of the driven shaft from that of the master shaft, a primary control mechanism actuated by a slide reciprocated by said driven shaft having a train connected to operate said correcting means and having a stop device to limit its control to a predetermined range comprehending the lesser deviations in the speed of the driven shaft from that of the master shaft, and an auxiliary control mechanism actuated by means mounted on said slide having a train connected to operate said correcting means throughout said deviations in speed that are greater than those within said predetermined range and having the member of its train to be engaged by its actuator so related to the path of travel of the slide that engagement of these two parts cannot be effected until the slide is at substantially a limit of its said path of travel, whereby said two control mechanisms act successively upon said correcting means.

ERASTUS E. WINKLEY.